(12) United States Patent
Suzuki

(10) Patent No.: US 8,897,825 B2
(45) Date of Patent: Nov. 25, 2014

(54) WIRELESS COMMUNICATION DEVICE AND WIRELESS COMMUNICATION METHOD

(75) Inventor: Toshiyuki Suzuki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 128 days.

(21) Appl. No.: 13/822,034

(22) PCT Filed: Aug. 26, 2011

(86) PCT No.: PCT/JP2011/069321
§ 371 (c)(1),
(2), (4) Date: Mar. 11, 2013

(87) PCT Pub. No.: WO2012/043105
PCT Pub. Date: Apr. 5, 2012

(65) Prior Publication Data
US 2013/0165047 A1    Jun. 27, 2013

(30) Foreign Application Priority Data

Sep. 28, 2010 (JP) .................................. 2010-216834

(51) Int. Cl.
*H04B 7/26* (2006.01)
*H04W 76/02* (2009.01)
*H04W 12/06* (2009.01)

(52) U.S. Cl.
CPC ............... *H04B 7/26* (2013.01); *H04W 76/023* (2013.01); *H04W 12/06* (2013.01)
USPC ........................... 455/509; 455/513; 455/41.2

(58) Field of Classification Search
CPC ...... H04B 7/26; H04W 12/06; H04W 76/023; H04W 8/00; H04W 84/10; H04W 76/02
USPC ................. 455/41.2, 41.1, 404.2, 411, 432.1, 455/436–445, 452.1, 456.1, 509, 512, 513, 455/62, 67.11
See application file for complete search history.

(56) References Cited

U.S. PATENT DOCUMENTS

| | | | | |
|---|---|---|---|---|
| 2011/0293095 | A1* | 12/2011 | Ben Ayed | 380/270 |
| 2012/0164979 | A1* | 6/2012 | Bachmann et al. | 455/411 |
| 2013/0143526 | A1* | 6/2013 | Kanugovi et al. | 455/411 |
| 2013/0167196 | A1* | 6/2013 | Spencer et al. | 726/3 |
| 2013/0183936 | A1* | 7/2013 | Smtih et al. | 455/411 |
| 2014/0157135 | A1* | 6/2014 | Lee et al. | 715/738 |

FOREIGN PATENT DOCUMENTS

| | | |
|---|---|---|
| JP | 2004 248215 | 9/2004 |
| JP | 2010 28550 | 2/2010 |

OTHER PUBLICATIONS

Japanese Office Action Issued Mar. 27, 2012 in JP Patent Application No. 2010-216834 Filed Sep. 28, 2010 (with English translation).
International Search Report Issued Nov. 29, 2011 in PCT/JP11/069321 Filed Aug. 26, 2011.

* cited by examiner

*Primary Examiner* — Pablo Tran
(74) *Attorney, Agent, or Firm* — Oblon, Spivak, McClelland, Maier & Neustadt, L.L.P.

(57) ABSTRACT

A search part sends out a connection request signal and receives a connection response signal. A radio strength acquiring part acquires radio strength of an available device that has sent the connection response signal. A connection determining part determines whether or not the radio strength has increased, then becomes greater than or equal to a threshold value and has been constant for a period of time longer than or equal to a predetermined period of time. If it is determined that the radio strength has increased, then becomes greater than or equal to the threshold value and has been constant for a period of time longer than or equal to the predetermined period of time, an inter-device authentication part performs inter-device authentication with the available device.

4 Claims, 8 Drawing Sheets

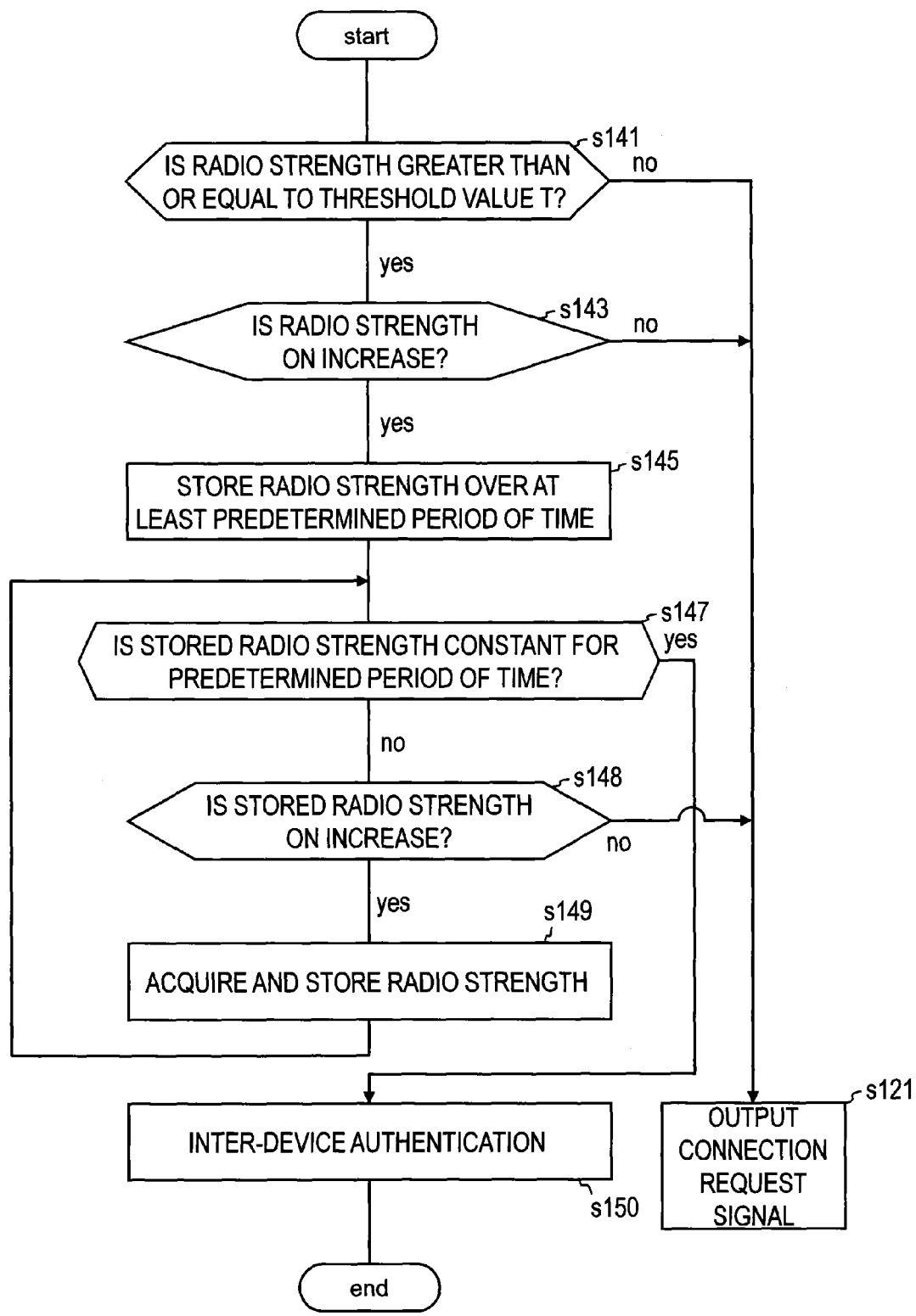

WIRELESS COMMUNICATION DEVICE AND WIRELESS COMMUNICATION METHOD

TECHNICAL FIELD

The present invention relates to a wireless communication device and a wireless communication method that connect an initiator device to an intended device.

BACKGROUND ART

A wireless communication device in Patent literature 1 is a known wireless communication device that performs data communication using Bluetooth®, (the same applies hereinafter), which is a short-range wireless communications technology.

When multiple wireless communication devices communicate each other through a short-range wireless communication interface, one of the wireless communication devices performs a process for connecting to the other wireless communication device before starting communication. In doing this, first the wireless communication device that attempts to connect (hereinafter also referred to as the "initiator device") needs to search for a wireless communication device that is located in a certain range and is waiting for a connection request (that is, a wireless communication device that is ready to receive a connection request; hereinafter such a wireless communication device is referred to as an "available device").

PRIOR ART LITERATURE

Patent Literature

Patent literature 1: Japanese Patent Application Laid-Open No. 2004-248215

SUMMARY OF THE INVENTION

Problem to be Solved by the Invention

However, there is a problem that operations for searching an available device are complicated. In addition, if there are multiple available devices in a certain range, one of the available devices to connect to (herein after referred to as the "intended device", that is, an intended device is a device to which a user is attempting to connect the initiator device among the available devices) needs to be selected. Operations for this selection are also complicated. The user needs to learn the complicated operation procedure beforehand. The complexity and confusingness of the operations present an obstacle to the use of wireless communication devices.

An object of the present invention is to provide a wireless communication device and a wireless communication method that allow the initiator device to be connected to an available device without needing complicated operations.

Means to Solve the Problem

To solve the problem described above, according to a first aspect of the present invention, a device sends a connection request signal and receives a connection response signal. The device acquires radio strength of an available device that has sent the connection response signal. Determination is made as to whether the radio strength has increased, then has become greater than or equal to a threshold value, and has been constant for a period of time longer than a predetermined period of time. If it is determined that the radio strength has increase, then has become greater than or equal to the threshold value and has been constant for a period of time longer than or equal to the predetermined period of time, inter-device authentication is performed with the available device.

Effects of the Invention

The present invention has the effect of enabling an initiator device to be connected with an available device without needing complicated operations.

BRIEF DESCRIPTION OF THE DRAWINGS

FIG. 8 is a diagram illustrating a process flow in the connection determining part 140.

DETAILED DESCRIPTION OF THE EMBODIMENTS

Figure 1:
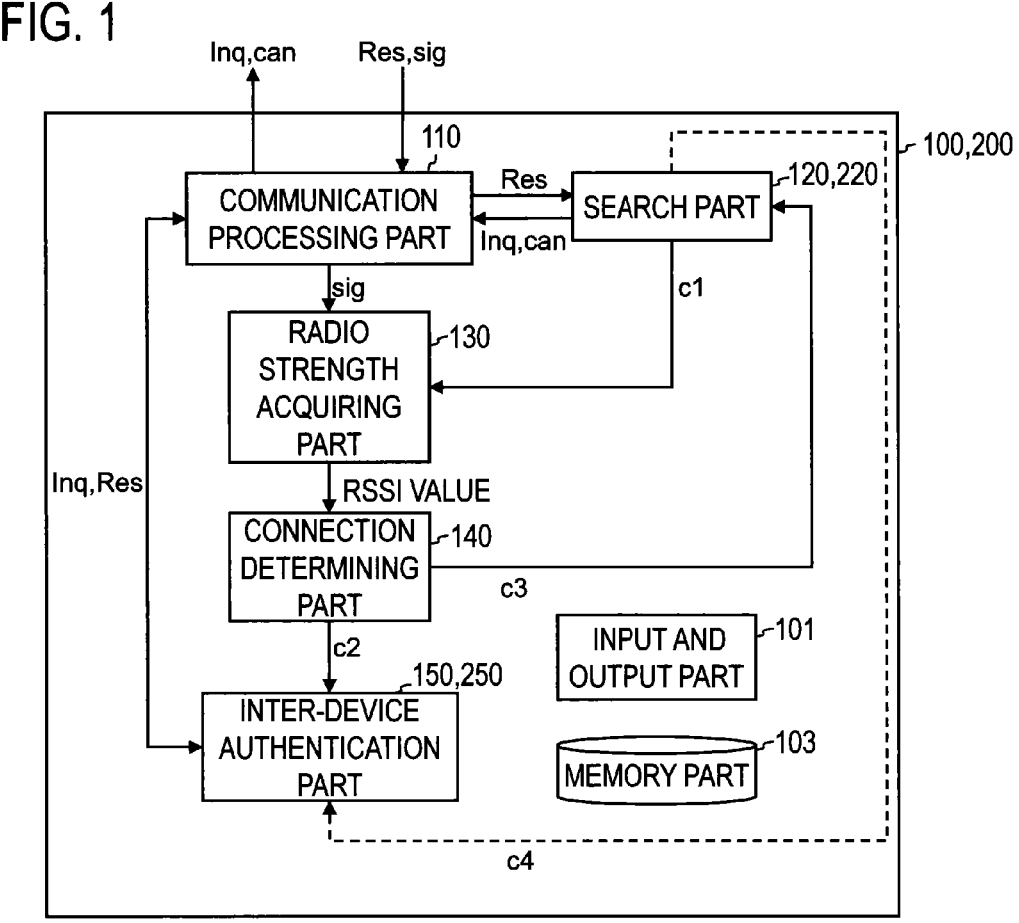
FIG. 1 is a block diagram illustrating an exemplary functional configuration of a wireless communication device 100.

The following first method may be conceivable for connecting an initiator device to an intended device without needing complicated operations. When searching for an intended device, the radio wave emitted from the initiator device for the search is weakened to significantly reduce the search range. A user moves the initiator device close to the intended device to connect the initiator device to the intended device. In this case, the action of the user to move the initiator device close to the intended device is equivalent to a search operation. Thus, the user can establish a connection without having to performing complicated operations.

However, the first connection method has the drawback of connecting the initiator device to any available device located near the initiator device. That is, the first method cannot determine whether an available device is located near the initiator device by chance or the user has brought the initiator device and the available device close to each other. Accordingly, there is a possibility to connect the initiator device to an unintended available device. If the initiator device is connected to an unintended available device, the user has to cancel the connection and then perform an operation to connect to the intended device. In addition, there are security concerns. For example, data contained in the initiator device may be read by an available device or data may be written from an available device to the initiator device.

To solve the problems, a wireless communication device according to an embodiment allows a user to connect the device to an intended device without having to perform any complicated operation and is capable of preventing erroneous detection of an unintended available device.

Embodiments of the present invention will be described below in detail.

First Embodiment

Wireless Communication Device 100

A wireless communication device 100 according to a first embodiment will be described with reference to FIG. 1. The wireless communication device 100 includes an input and output part 101, a memory part 103, a communication processing part 110, a search part 120, a radio strength acquiring part 130, a connection determining part 140 and an inter-device authentication part 150, for example. An overview of a process will be described below with reference to FIG. 2. Bluetooth, for example, may be used for wireless communication.

The search part 120 sends out a connection request signal Inq through the communication processing part 110 (s121). The connection request signal Inq may be Inquiry in Bluetooth. The search part 120 receives a connection response signal Res output from an available device through the communication processing part 110 (s122).

The radio strength acquiring part 130 acquires the radio strength of the available device which has sent the received connection response signal Res (s130).

The connection determining part 140 determines whether or not (1) the radio strength has increased, (2) then the radio strength has become greater than or equal to a threshold value, and (3) the radio strength has been constant for a period of time longer than a predetermined period of time (s140).

If the radio strength has increased, then become greater than or equal to the threshold value and has been constant for a period of time longer than the predetermined period of time, the inter-device authentication part 150 performs inter-device authentication with the available device that has output the radio strength (s150). Details of these components will be described later. The method of the inter-device authentication may be pairing in Bluetooth, for example.

It is assumed here that an available device uses a wireless communication technology corresponding to the wireless communication technology of the wireless communication device 100 and, when receiving a connection request signal Inq, outputs a connection response signal Res. Examples of available devices include a car navigation system, a PDA, a wireless earphone, a personal computer, and a speaker among others.

Hardware Configuration

Figure 3:
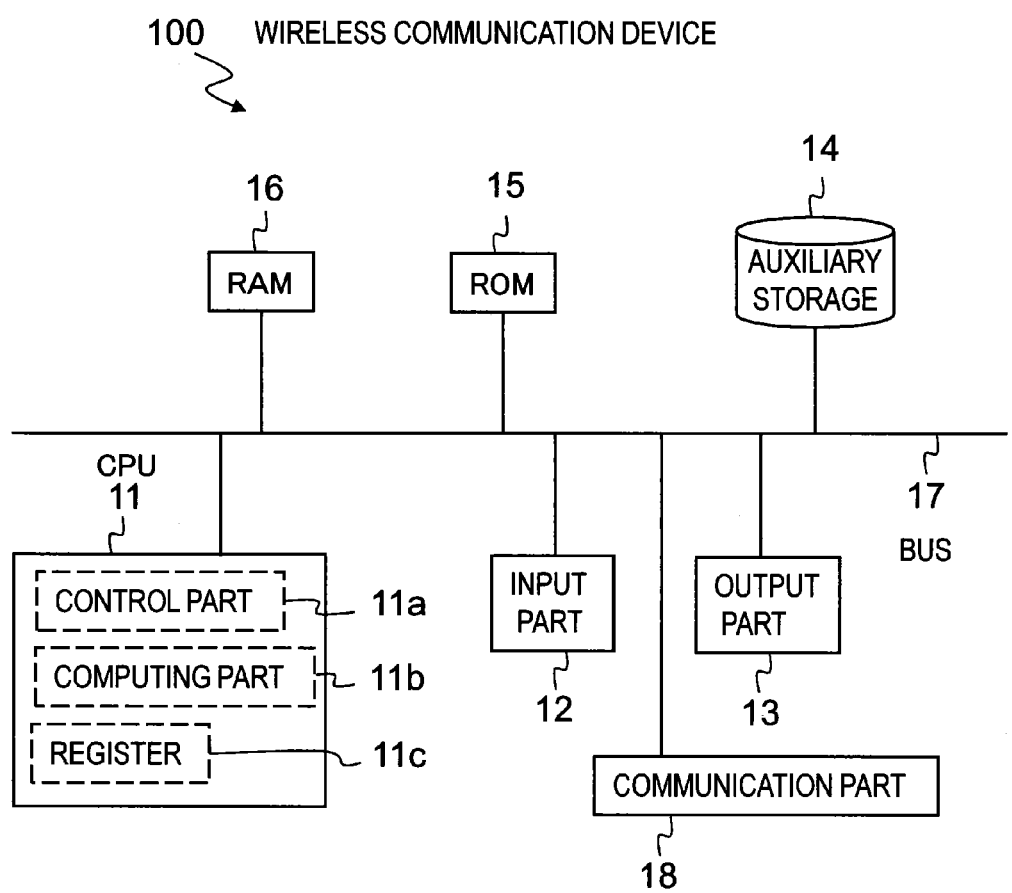
FIG. 3 is a block diagram illustrating an exemplary hardware configuration of the wireless communication device 100.

FIG. 3 is a block diagram illustrating an exemplary hardware configuration of the wireless communication device 100 on the first embodiment. As illustrated in FIG. 3, the wireless communication device 100 of this example includes a CPU (Central Processing Unit) 11, an input part 12, an output part 13, an auxiliary storage 14, a ROM (Read Only Memory) 15, a RAM (Random Access Memory) 16 and a bus 17.

The CPU 11 of this example includes a control part 11a, a computing part 11b and a register 11c and executes various computing operations according to various kinds of programs loaded in the register 11c. The input part 12 may be a keyboard, a mouse, buttons for entering characters and numbers and issuing instructions, a touch panel, a microphone for voice input and the like. The output part 13 may be a liquid-crystal panel outputting images and a speaker outputting audio. The auxiliary storage 14 may be a hard disk and a semiconductor memory, for example, and stores programs for causing a computer to function as the wireless communication device 100 and various kinds of data. The programs and various data are loaded into the RAM 16 and used by the CPU 11 and other components. The communication part 18 is implemented by a baseband chip. The term baseband chip refers to one of IC chips built in the wireless communication device 100 that is used for providing wireless communications. The bus 17 interconnects the CPU 11, the input part 12, the output part 13, the auxiliary storage 14, the ROM 15, the RAM 16 and the communication part 18 to allow them communicate with one another. Examples of the hardware described above include a mobile phone, a PDA (Personal Digital Assistant) and a notebook personal computer among others.

FIG. 1 is a block diagram illustrating a functional configuration of the wireless communication device 100 configured by a wireless communication program read into and executed by the CPU 11. An input and output part 101 in FIG. 1 is equivalent to the input part 12 and the output part 13. A memory part 103 in FIG. 1 is equivalent to any of the auxiliary storage 14, the RAM 16, the register 11c and other buffer memory and cache memory or the like, or a memory area that is a combination of any of these. A communication processing part 110 in FIG. 1 is equivalent to the communication part 18. A search part 120, a radio strength acquiring part 130, a connection determining part 140 and an inter-device authentication part 150 are configured by causing the CPU 11 to execute a wireless communication program.

Configuration as Mobile Phone

The first embodiment will be described in which a mobile phone is used as the wireless communication device 100 (see FIG. 4). The wireless communication device 100 includes hardware 170 including a short-range wireless communication processing part 171. The wireless communication device 100 also includes middleware 180 including a short-range wireless communication control part 181, a control part 183 and a setting management part 185, and applications 190 including a non-native applications 191 and native applications 193 (including a short-range wireless communication application 193a, a voice communication application 193b, a music application 193 and the like). The native applications are applications designed specifically for the CPU, software platform and API of the mobile phone on which they are executed. The non-native applications are applications executed on a virtual machine implemented on the mobile phone on which they are executed. Examples of the non-native applications include Java® applications such as an i-αppli®.

The short-range wireless communication processing part 171 is equivalent to the communication processing part 110 in FIG. 1 and the communication part 18 in FIG. 3 and is implemented by a baseband chip. The short-range wireless communication processing part 171 receives wireless information from an available device and provides the information to the middleware 180. The short-range wireless communication processing part 171 also provides information received from the middleware 180 to an available device.

The short-range wireless communication control part 181 manages control commands within the middleware 180 according to operations in host applications and sends information from hosts (such as the control part 183) to the hardware 170. In addition, the short-range wireless communication control part 181 provides information from the hardware 170 (the physical layer) which has received wireless information to the hosts.

The control part 183 performs various controls relating to wireless communications. The control part 183 is equivalent to the search part 120, the radio strength acquiring part 130, the connection determining part 140 and the inter-device authentication part 150 in FIG. 1.

The user can activate the short-range wireless communication application 193a and can set a short-range wireless communication function from a menu for short-range wireless communication on the wireless communication device. Settings of the short-range wireless communication function will be described later.

The set short-range wireless communication function is managed by the setting management part 185 and is used for various kinds of controls performed in the control part 183.

The voice communication application 193b is an application for controlling the voice communication function of the mobile phone (controlling calls and other services). The music application 193c is an application for enabling the mobile phone to function as a music player. The control part 183 processes notifications from applications that have such particular functions. For example, when the user activates the voice communication application 193b or the music application 193c, the control part 183 automatically makes a connection to an appropriate intended device. In doing this, the control part 183 outputs a radio wave (a connection request signal) through the short-range wireless communication control part 181 and the short-range wireless communication processing part 171 and performs a connection process. A signal from the intended device is sent to an appropriate application through the short-range wireless communication processing part 171, the short-range wireless communication control part 181 and the control part 183. In doing this, the control part 183 provides a status indication (such as radio strength) at the time of the inter-authentication to the application in real time. The non-native applications 191 may be applications that have functions equivalent to those of the native applications 193, including short-range wireless communication application 193a, the voice communication application 193b, and the music application 193c and the like.

The components in FIG. 1 will be described below in detail.

Search Part 120

The search part 120 outputs a connection request signal Inq through the communication processing part 110 (s121). If there is an available device in the reachable range of the connection request signal Inq, the available device outputs a connection response signal Res. The search part 120 receives the connection response signal Res through the communication processing part 110 (s122) and sends a control signal c1 containing information that identifies the available device that has output the connection response signal Res to the radio strength acquiring part 130. At this point of time, the search part 120 outputs a connection cancel signal can to the available device through communication processing part 110 to halt the process for connecting to the available device that has output the connection response signal Res.

Note that if there is no available device in the reachable range of the connection request signal Inq, the search part 120 continues outputting the connection request signal Inq at regular intervals (for example 10 times per second) until the search part 120 receives a connection response signal Res. (s121).

Radio Strength Acquiring Part 130

When receiving a control signal c1, the radio strength acquiring part 130 acquires a radio wave sig through communication processing part 110 from the available device that has sent out the received connection response signal Res, and acquires the radio strength from the radio wave sig (s130). An RSSI value (Received Signal Strength Indication), for example, may be used as the radio strength. The radio strength acquiring part 130 may be implemented by an RSSI circuit (Received Signal Strength Indicator). The radio strength acquiring part 130 sends the acquired radio strength to the connection determining part 140. The radio strength acquiring part 130 may be configured to send the radio strength to the memory part 103 to store. The radio strength acquiring part 130 acquires radio strength at regular intervals (for example 10 times per second).

Connection Determining Part 140

The connection determining part 140 determines whether or not radio strength has increased, then become greater than or equal to a threshold T and has been constant for a predetermined period of time or longer (s140).

It is assumed here that when the user intends to connect the initiator device to an intended device, the user bring the initiator device and the intended device close to each other and holds the initiator device over the intended device. This action will be described with reference to FIGS. 5 and 6.

Figure 5A:
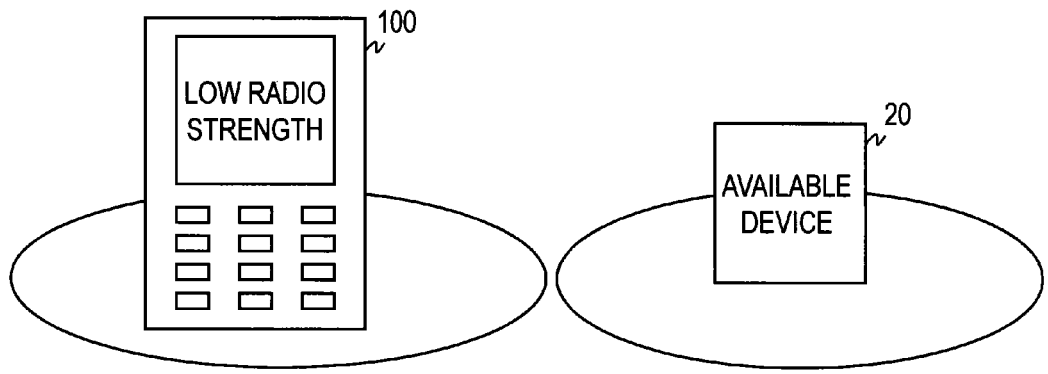
FIG. 5A is a diagram illustrating an exemplary situation where the initiator device 100 and an available device 20 are at a large distance from each other and the radio strength is low.
Figure 5B:
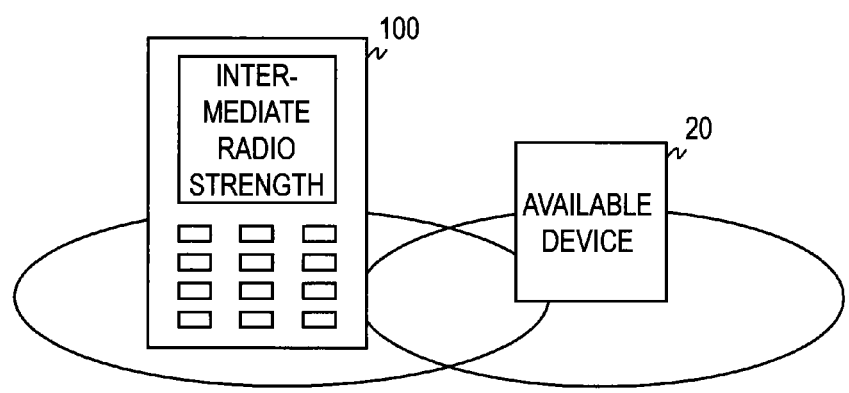
FIG. 5B is a diagram illustrating an exemplary situation where the radio strength between the initiator device 100 and an available device 20 is at a medium level.
Figure 5C:
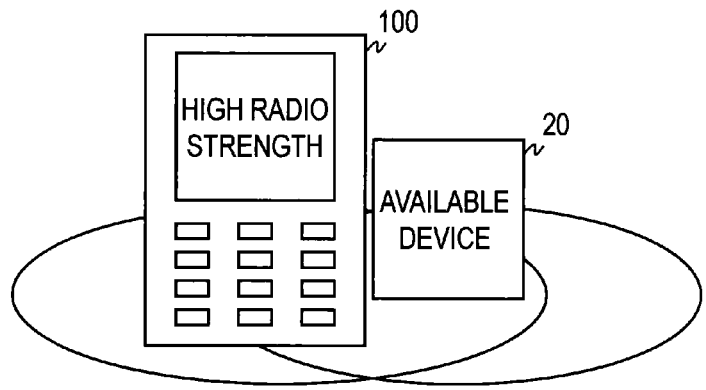
FIG. 5C is a diagram illustrating an exemplary situation where the initiator device 100 and an available device 20 are at a small distance from each other and the radio strength is high.
Figure 6:
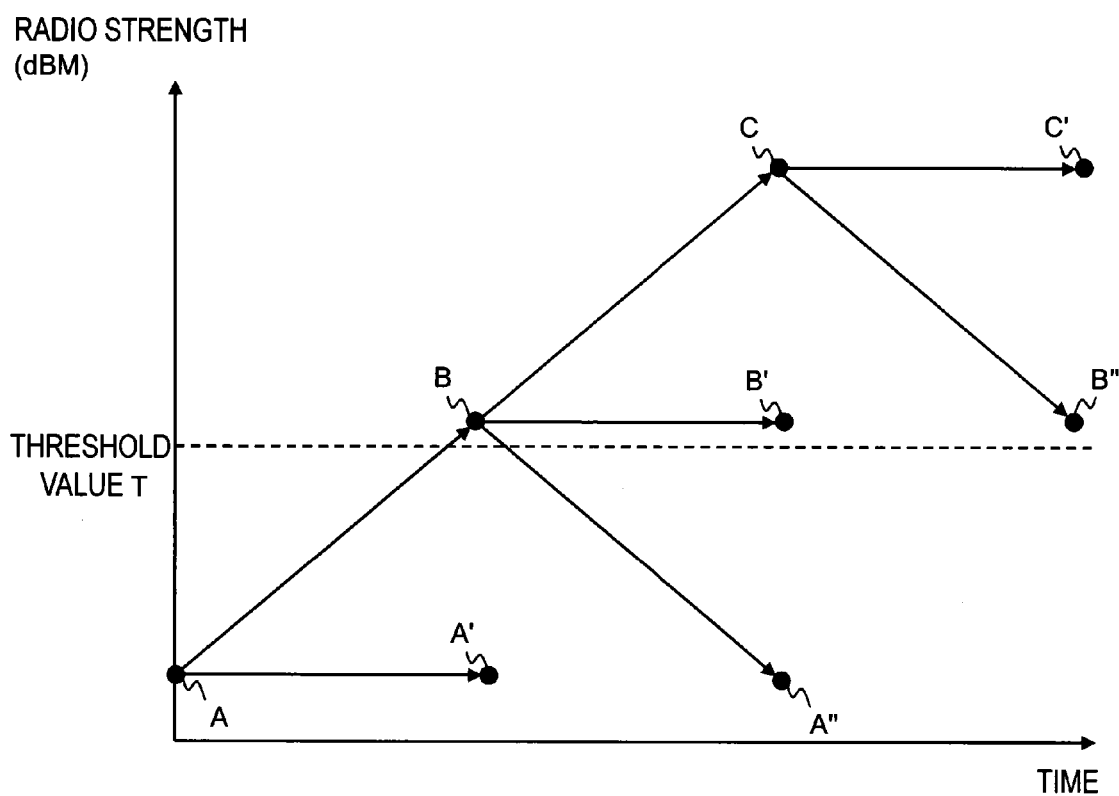
FIG. 6 is a diagram illustrating radio strengths in FIGS. 5A, 5B and 5C.

The radio strength in the situation in FIG. 5A corresponds to point A in FIG. 6. When the user intends to connect the initiator device 100 to an available device 20, the user moves the initiator device 100 close to the available device 20 as in FIG. 5B. The radio strength at this point of time corresponds to point B in FIG. 6. When the user holds the initiator device 100 over the available device 20, the initiator device 100 stays in the state illustrated in FIG. 5B for a period of time longer than or equal to a certain period of time. The radio strength changes from point B to point B' in FIG. 6. When the user moves the initiator device 100 closer to the available device 20 to place it in the state illustrated in FIG. 5C, the radio strength is at point C in FIG. 6. Then, the user holds the initiator device 100 over the available device 20, the initiator device 100 stays in the state illustrated in FIG. 5C for a certain period of time or longer. The radio strength transitions from point C to point C' in FIG. 6. That is, when transition from A to B to B' in FIG. 6 takes place and when transition from point A to B to C to C' takes place, it is determined that the action of moving the initiator device closer to the available device and holding the initiator device over the available device is performed, and inter-device authentication between the initiator device and the available device is performed.

When the state illustrated in FIG. 5A continues, transition from point A to point A' takes place. During this time period, the user is not moving the initiator device 100 close to the available device 20 and the radio strength is low (the distance is large). Therefore, it is determined that the user does not intend to make a connection. When the user moves the initiator device 100 in the state in FIG. 5A to close to the available device 20 as in FIG. 5B, then away from the available device 20 without holding the initiator device 100 over the available device 20 (places the initiator device 100 in the state in FIG. 5A), transition from point A to B to A" in FIG. 6 takes place. At this point of time, it is determined that the user has gone away and has no intention to make a connection. When the user moves the initiator device 100 in the state in FIG. 5A close to the available device 20 as in the FIG. 5C, then away from the available device 20 as in FIG. 5B, transition from point A to B to C to B" in FIG. 6 takes place. At this point of time, it is determined that the user has gone away and has no intention to make a connection. Even if the radio strength is greater than or equal to the threshold value T for a period of time longer than or equal to a predetermined period of time, it is determined that the user has only passed by the available device 20 and has no intention to make a connection. In order to detect the action of holding the initiator device 100 near and over the available device 20, conditions are set that the radio strength is greater than or equal to the threshold value T and is constant for a period of time longer than or equal to the predetermined time period. While a situation in which the initiator device 100 is moved close to an available device 20 has been described in this example, the radio strength changes from point A to B or from point A to B to C in FIG. 6 when the available device 20 is moved close to the initiator device 100 or when the available device 20 and the initiator device 100 are moved close to each other as well. When subsequently the action of holding the initiator device over the available device is performed, it is determined that the user has an intention to make a connection.

Figure 7:
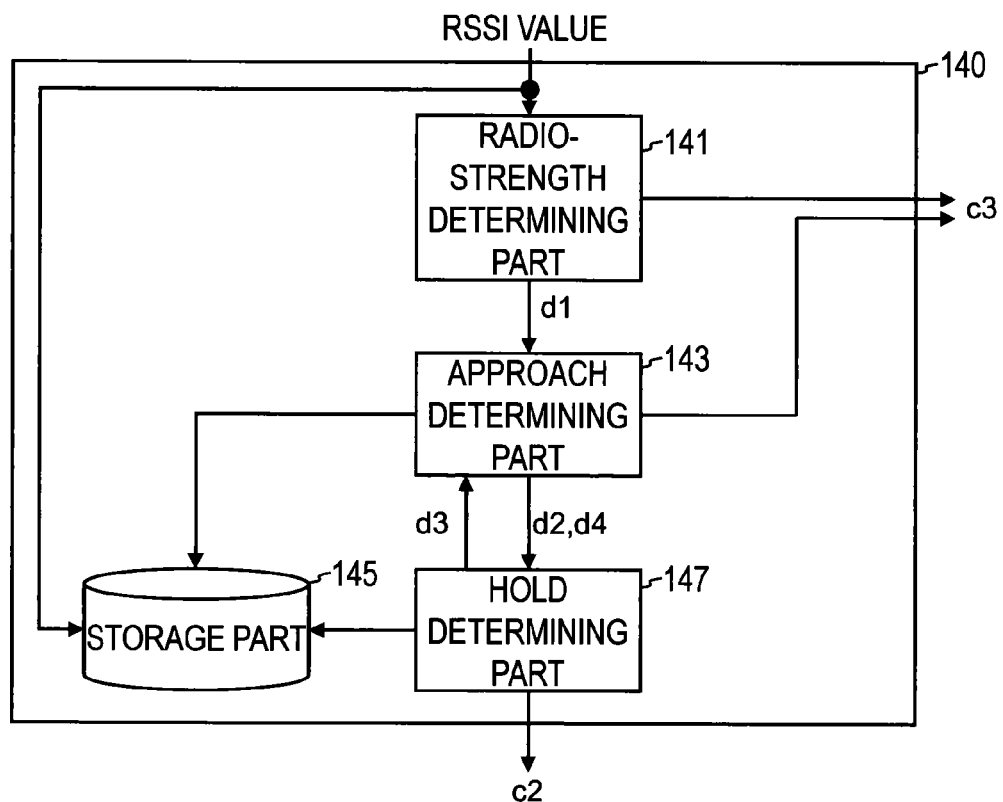
FIG. 7 is a block diagram illustrating an exemplary functional configuration of a connection determining part 140.

For the purpose of detecting the series of the actions of bringing the initiator device and an available device close to each other and holding the initiator device over the available device, the connection determining part 140 includes a radio strength determining part 141, an approach determining part 143, a storage part 145 and a hold determining part 147 (see FIG. 7). A process performed by the connection determining part 140 will be described below with reference to FIGS. 7 and 8.

Radio-Strength Determining Part 141

The radio strength determining part 141 determines whether or not radio strength acquired by the radio strength acquiring part 130 is greater than or equal to a threshold value T (s141). If the radio strength is greater than or equal to the threshold value T (for example if the radio strength is at any of points B, B", C and C' in FIG. 6), the radio-strength determining part 141 sends a control signal d1 to the approach determining part 143. On the other hand, if the radio strength is less than the threshold value T (if the radio strength is at any of points A, A' and A"), the radio-strength determining part 141 sends a control signal c3 to the search part 120. The threshold value T can be set as appropriate according to the sizes and uses of the initiator device and an available device. For example, the radio strength acquired when the distance between the initiator device and an available device is 20 cm may be preset as the threshold value T.

Approach Determining Part 143

When radio strength is determined to be greater than or equal to the threshold value T, the approach determining part 143 determines whether or not the radio strength is on the increase (s143). When the approach determining part 143 receives a control signal d1, the approach determining part 143 refers to the memory part 103 or the storage part 145 to acquire past radio strengths and determines whether or not the current radio strength is on the increase. If the current radio strength is on the increase (for example the radio strength has changed from point A to B or from point B to C in FIG. 6), the approach determining part 143 sends a control signal d2 to the hold determining part 147. On the other hand, if the radio strength is not on the increase (for example the radio strength has changed from point A to A', or from point B to B', or from point C to C', or from point B to A", or from point C to B"), the approach determining part 143 sends a control signal c3 to the search part 120.

In the first connection method, when an available device at a far distance is transmitting a strong radio wave, it is possible that the available device is determined to be at a close distance and erroneously detected as an intended device. In the first embodiment, in contrast, the provision of the approach determining part 143 prevents the initiator device from being connected to an available device that is located at a far distance and is transmitting constantly a strong radio wave. This configuration can prevent an available device from being erroneously detected when the user does not intend to bring the initiator device and the available device close to each other.

One or a plurality of past radio strengths may be used. If one radio strength is used, the previous acquired radio strength is subtracted from the current radio strength. If the difference is positive, it is determined that the radio strength is on the increase; if the difference is 0 or negative, it is determined that the radio strength is not on the increase. If a plurality of radio strengths are used, for example if radio strengths (for example 10 values) for a period of time of one second are acquired, determination is made as to whether the plurality of radio strengths generally are on the increase.

Storage Part 145

The storage part 145 stores radio strength of an available device over at least a predetermined period of time (s145). For example, when radio strength is on the increase, the storage part 145 stores radio strengths of the available device acquired during at least a predetermined period of time since the determination at the approach determining part 143. The storage part 145 may be a portion of the memory part 103. The radio strengths for a predetermined period of time are radio strengths for a period of time required for the hold determining part 147, which will be described later, to determine whether the radio strengths is constant or not. The radio strengths for the predetermined period of time can be set as appropriate according to the uses of the initiator device and an available device. For example, a setting may be made to store radio strengths (for example 20 values) for two seconds.

Hold Determining Part 147

If radio strength is on the increase, the hold determining part 147 determines whether or not the stored radio strength during the predetermined period of time since determination by the approach determining part 143 is constant (s147). For example, when the hold determining part 147 receives the control signal d2, the hold determining part 147 waits until radio strengths during the predetermined period of time since the reception of the control signal d2 are stored in the storage part 145 and then refers to the storage part 145 to acquire radio strengths stored during the predetermined period of time. If the stored radio strengths are constant (for example, if transition from point A to A', from point B to B' or from point C to C' in FIG. 6 takes place), the hold determining part 147 sends a control signal c2 to the inter-device authentication part 150.

On the other hand, if the stored radio strength is not constant, the hold determining part 147 further determines whether or not the stored radio strength is on the increase (s148). For example, the hold determining part 147 sends a control signal d3 to the approach determining part 143, which received the control signal d3, refers to the storage part 145 to acquire stored radio strengths and determines whether or not the radio strength is on the increase. If the stored radio strength is on the increase (for example if transition from point A to B or from point B to C in FIG. 6 has occurred), the approach determining part 143 sends a control signal d4 to the hold determining part 147. On the other hand, if the radio strength is not on the increase (for example if transition from point A to A', or from point B to B', or from point C to C', or from point C to B" in FIG. 6 has occurred), the hold determining part 147 sends the control signal c3 to the search part 120.

The radio strength acquiring part 130 acquires one new radio strength and stores the newly acquired radio strength in the storage part 145 (s149). That is, the latest radio strengths for the predetermined period of time are always stored in the storage part 145.

The hold determining part 147, which has received the control signal d4, determines whether or not the newly stored radio strengths are constant (s147). When the hold determining part 147 receives the control signal d4, the hold determining part 147 waits until the radio strength at the next time point is stored in the storage part 145 and then refers to the storage part 145 to acquire the latest radio strengths for the predetermined period of time. If the stored radio strengths are constant, the hold determining part 147 sends the control signal c2 to the inter-device authentication part 150. If the radio strengths are not constant, the hold determining part 147 sends the controls signal d3 to the approach determining part 143. The sequence from s147 through s149 is repeated until the approach determining part 143 sends the control signal c3 to the search part 120 or the hold determining part 147 sends the control signal c2 to the inter-device authentication part 150. By performing the repetitive process, transition from point A to B to C to C' can be detected as an intention to make a connection.

The term "constant" as used herein for determining whether or not stored radio strengths are constant not only refers to a state where all of the stored radio strengths are the same but also encompasses a state where the maximum and minimum values of the stored radio strength fall within a predetermined range (for example within ±2 dB of the mean value of the stored radio strengths).

The search part 120, which has received the control signal c3, outputs a connection request signal Inq through the communication processing part 110 (s121) to search for an available device.

Inter-Device Authentication Part 150

When radio strength has increased, then has become greater than or equal to the threshold T and has been constant for a period of time longer than or equal to a predetermined period of time, the inter-device authentication part 150 performs inter-device authentication with the available device that has output the radio strength (s150). For example, the inter-device authentication part 150 first outputs a connection request signal Inq through the communication processing part 110 and receives a connection response signal Res from the available device through the communication processing part 110. The inter-device authentication part 150 then outputs a signal requesting a link key L-key to the available device that has output the connection response signal Res, receives the link key L-key from the available device through the communication processing part 110, and stores the link key L-key in the memory part 103. As a result, the initiator device 100 and the available device share the same link key and are mutually authenticated. This enables the initiator device and the available device to wirelessly communicate with each other.

The inter-device authentication part 150 may use other conventional technique for inter-device authentication. For example, a passkey that is preset in the available device may be input from the initiator device.

Settings of Short-Range Wireless Communication Function

Figure 4:
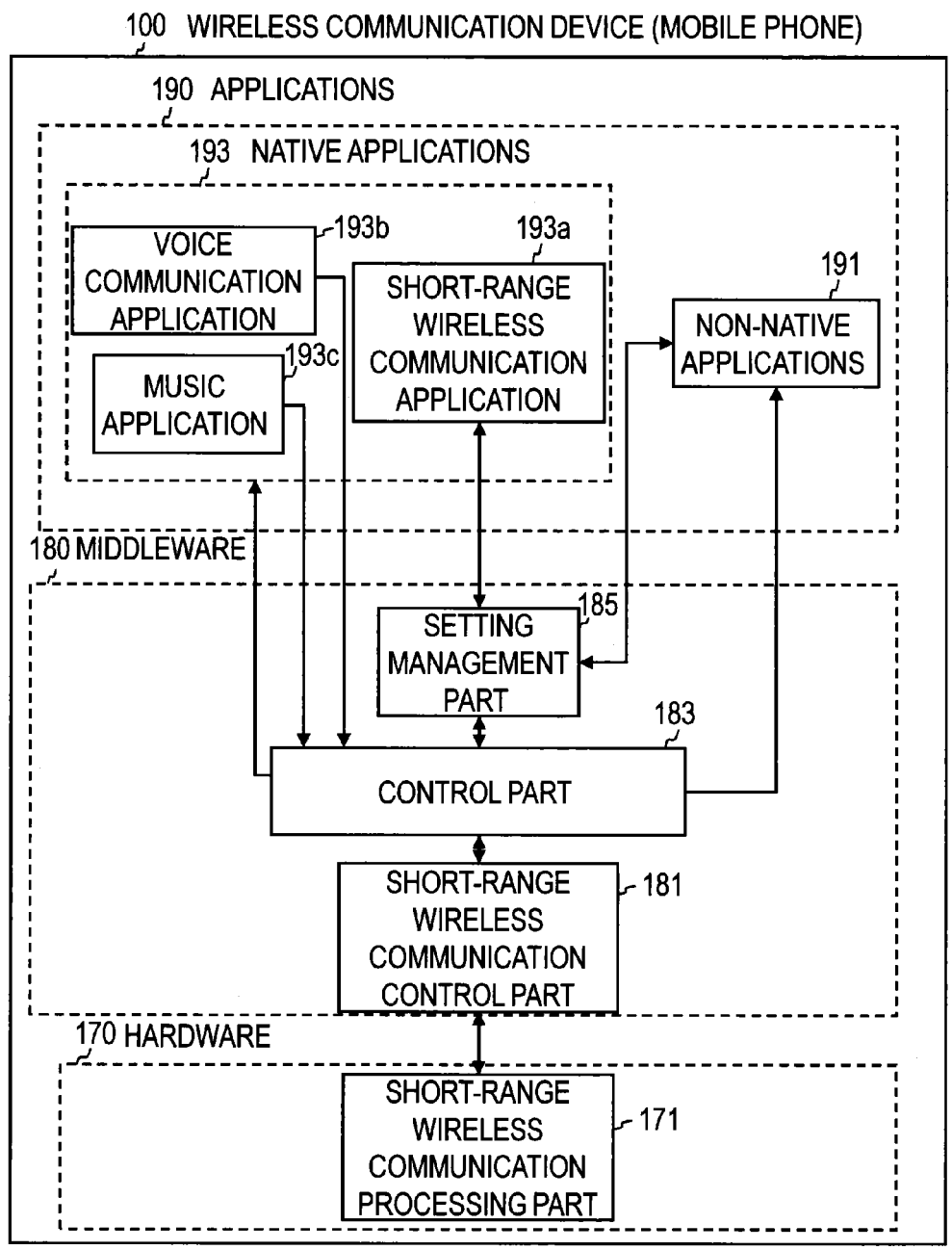
FIG. 4 is a block diagram illustrating an exemplary software configuration of a wireless communication device 100 which is a mobile phone.

The time between output of a connection request signal Inq from the search part 110 (or reception of a connection response signal Res) after activation of the short-range wireless communication application 193a in FIG. 4 and output of a connection cancel signal "can" can be set. The output power of the connection request signal Inq and the length of a predetermined period of time used by the hold determining part 147 to determine that the initiator device is being held over an available device can be set. In addition, the threshold value T used by the radio-strength determining part 141 can be set. This means that the radio-strength determining part 141 can determine whether or not the distance between the initiator device 100 and an available device is less than a certain distance and the certain distance can be set.

Advantageous Effects

The configuration described above allows the user to connect the initiator device to an available device without performing a complicated operation. That is, inter-device authentication and wireless communication can be performed simply by bringing the initiator device and the intended device close to each other. Furthermore, inter-device authentication that reflects an intention of the user to make a connection can be accomplished by detecting a series of actions of bringing the initiator device and the available device close to each other and holding the initiator device over the available device, thereby preventing erroneous detection of an available device to which the user does not intend to connect.

Variations

Figure 2:
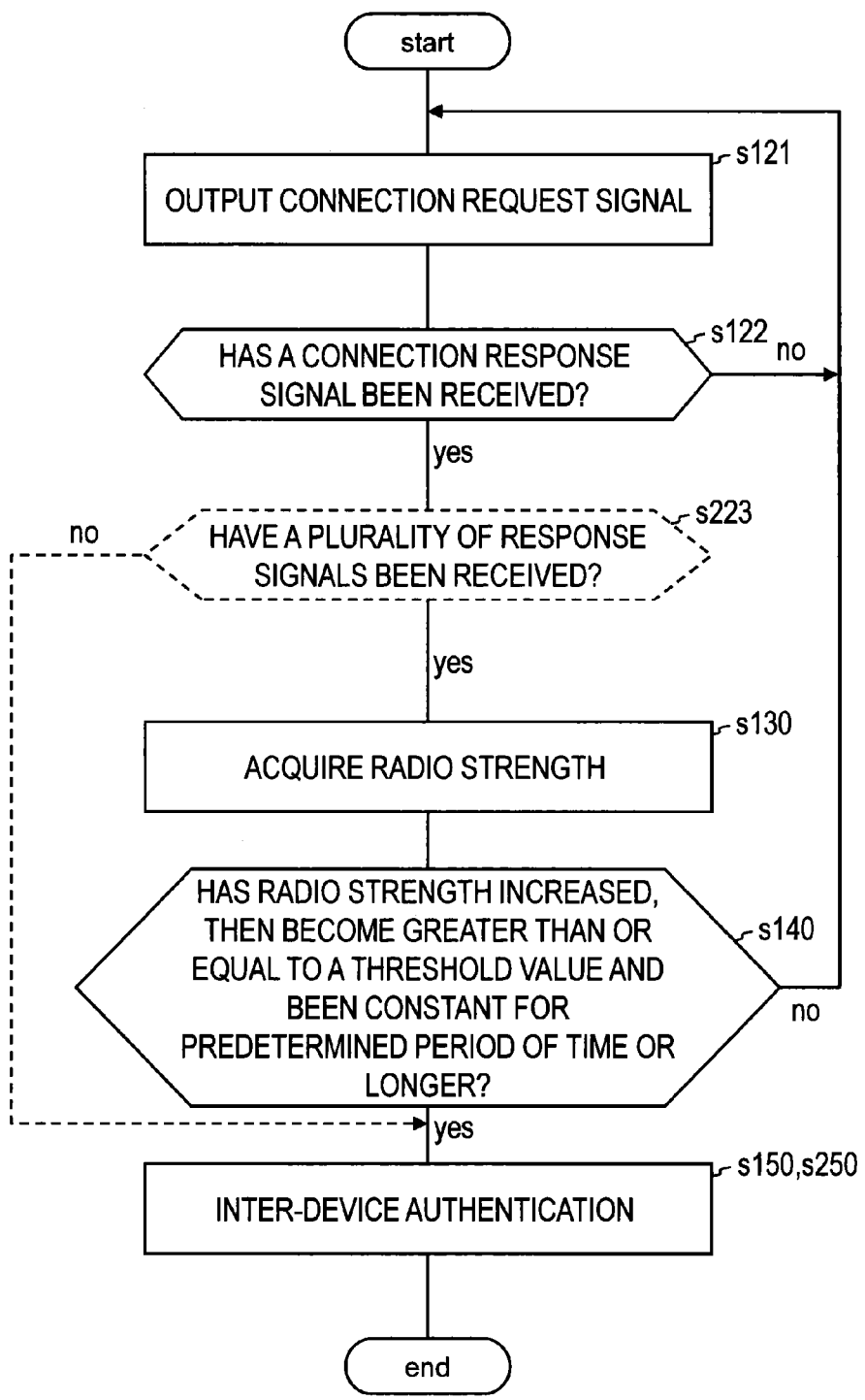
FIG. 2 is a diagram illustrating a process flow in the wireless communication device 100.

While a process flow in a situation where there is only one available device as in FIG. 2 has been described in the first embodiment, a process similar to the process can be performed to address a situation where there is a plurality of available devices. When the search part 120 outputs a connection request signal Inq through the communication processing part 110 and receives connection response signals Res from a plurality of available devices, the search part 120 sends a control signal c1 containing information identifying each of the available devices that have output the connection response signals Res to the radio strength acquiring part 130. The radio strength acquiring part 130 uses the control signal c1 to acquire the radio strength of each of the available devices corresponding to the connection response signals Res. The connection determining part 140 performs a determination process for each of the radio strengths. The inter-device authentication part 150 performs inter-device authentication with each of the available devices that have output the radio strengths determined to satisfy predetermined requirements as a result of the determination process.

The search part 120 may be configured to continue outputting a connection request signal Inq at regular intervals to search an available device after sending a control signal c1 to the radio strength acquiring part 130. That is, the search part 120 may continue outputting the connection request signal Inq at regular intervals regardless of whether or not it has received a connection response signal Res. This configuration enables constant monitoring for an available device with which inter-device authentication is to be performed.

As illustrated in FIG. 5, a wireless communication device 100 (for example a mobile phone) may be configured to display an indication of radio strength on the display of the wireless communication device 100. This configuration allows the user to readily check which of available devices the wireless communication device 100 is attempting to connect with.

Second Embodiment

Wireless Communication Device 200

A wireless communication device 200 according to a second embodiment will be described with reference to FIGS. 1 and 2. Only differences from the wireless communication device 100 will be described. The wireless communication device 200 includes an input and output part 101, a memory part 103, a communication processing part 110, a search part 220, a radio strength acquiring part 130, a connection determining part 140, and an inter-device authentication part 250, for example. The search part 220 and the inter-device authentication part 250 perform processes different from those in the wireless communication device 100.

It is assumed in this embodiment that when a user intends to connect an initiator device to an intended device, the user brings the initiator device and the intended device close to each other and holds the initiator device over the intended device and that the intended device is located near the initiator device (at least at a distance from where a connection response signal can be received).

Search Part 220

The search part 220 sends out a connection request signal and receives a connection response signal or signals. If the search part 200 receives a single connection response signal (s223; indicated by a dashed line in FIG. 2), the search part 220 sends a control signal c4 to the inter-device authentication part 250 (indicated by a dashed line in FIG. 1). On the other hand, if the search part 220 receives a plurality of connection response signals (s223), the search part 220 outputs a control signal c1 to the radio strength acquiring part 130 and performs a process similar to that of the first embodiment.

Inter-Device Authentication Part 250

When the inter-device authentication part 250 receives the control signal c4 from the search part 220, the inter-device authentication part 250 performs inter-device authentication with an available device that has output a connection response signal (s250). When the inter-device authentication part 250 receives the control signal c2 from the connection determining part 140, the inter-device authentication part 250 performs a process similar to that of the first embodiment.

Advantageous Effects

Like the configuration of the first embodiment, the configuration described above has the effects of connecting the initiator device with an intended device without needing a complicated operation and preventing an erroneous detection of an available device to which the user does not intend to connect. Furthermore, when there is not an available device other than the intended device near the initiator device, inter-device authentication can be immediately performed to reduce the time and amount of processing required for inter-device authentication.

Other Variations

The foregoing embodiments of the present invention have been presented for the purpose of illustration and description and are not intended to be exhaustive or limit the present invention to the disclosed precise forms. Modifications and variations are possible in light of the above teaching. The embodiments have been chosen and described in order to provide the best illustration of the principles of the present invention and to allow those skilled in the art to use the present invention in various embodiments and with various modifications appropriate for the contemplated actual use. All such modifications and variations are within the scope of the present invention as determined by the appended claims when interpreted in accordance with the breadth to which they are fairly, legally and equitably entitled.

What is claimed is:

1. An wireless communication device comprising:
   a search part sending out a connection request signal and receiving a connection response signal;
   a radio strength acquiring part acquiring radio strength of an available device that has sent the connection response signal;
   a connection determining part determining whether or not the radio strength has increased, then has become greater than or equal to a threshold value and has been constant for a period of time longer than or equal to a predetermined period of time; and
   an inter-device authentication part performing inter-device authentication with the available device if it is determined that the radio strength has increased, then has become greater than or equal to a threshold value and has been constant for a period of time longer than or equal to the predetermined period of time.

2. The wireless communication device according to claim 1,
   wherein the connection determining part comprises:
   a radio strength determining part determining whether or not the radio strength acquired by the radio strength acquiring part is greater than or equal to the threshold value;
   an approach determining part determining whether or not the radio strength at the point of time at which the radio strength is determined to be greater than or equal to the threshold value is on the increase;
   a storage part storing the radio strength of the available device for at least a predetermined period of time; and
   a hold determining part determining, when the radio strength is on the increase, whether or not the radio strength stored over the predetermined period of time since determination at the approach determining part is constant.

3. The wireless communication device according to claim 1 or 2,
- wherein the search part sends a connection request signal, receives a connection response signal or signals, and determines whether or not the search part has received a single connection response signal; and
- the inter-device authentication part performs inter-device authentication with the available device if the search part has received the single connection response signal or if each of radio strengths has increased, then has become greater than or equal to a threshold value and has been constant for a period of time longer than or equal to the predetermined period of time.

4. A wireless communication method comprising:
- a search step of sending out a connection request signal and receiving a connection response signal;
- a radio strength acquiring step of acquiring radio strength of an available device that has sent the connection response signal;
- a connection determining step of determining whether or not the radio strength has increased, then has become greater than or equal to a threshold value and has been constant for a period of time longer than or equal to a predetermined period of time; and
- an inter-device authentication step of performing inter-device authentication with the available device if it is determined that the radio strength has increased, then has become greater than or equal to a threshold value and has been constant for a period of time longer than or equal to the predetermined period of time.

* * * * *